July 6, 1943.                 E. GUSTAFSSON ET AL                 2,323,764
AUTOMATIC DRAIN VALVE
Filed May 8, 1942
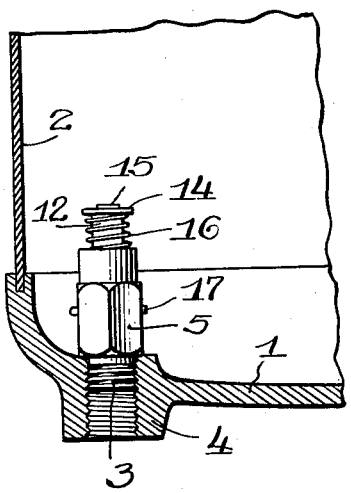
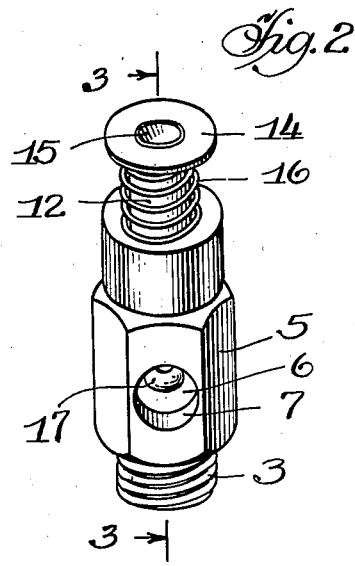
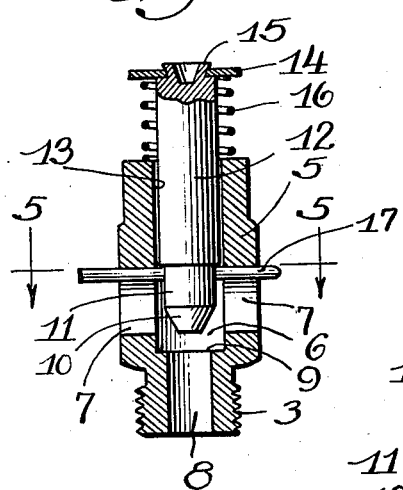
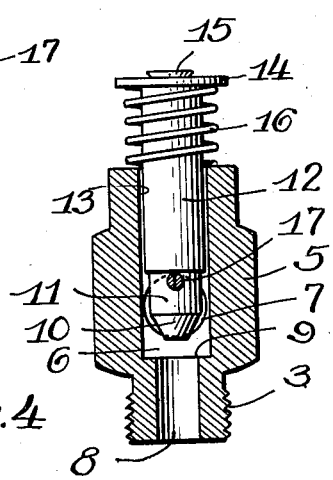
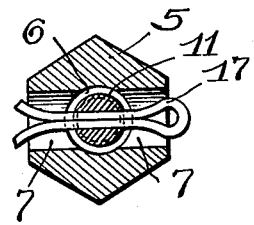
INVENTORS
Eric Gustafsson
and William L. Wilmes,
By Louis A. Bisson, Atty.

Patented July 6, 1943

2,323,764

UNITED STATES PATENT OFFICE 2,323,764

AUTOMATIC DRAIN VALVE

Eric Gustafsson and William L. Wilmes, Chicago, Ill., assignors to Binks Manufacturing Company, Chicago, Ill., a corporation of Delaware Application May 8, 1942, Serial No. 442,152

5 Claims. (Cl. 137—34.1)

The present invention relates to drain valves and particularly of the automatic type.

In the use of air, or other gas, in the spray gun art, or the like, the air usually entrains oil or the like used as a lubricant in the compressor, and also water which may result from condensation of steam when using a steam pump, or from the moisture naturally carried in the air. When using air to atomize and spray material, such as paint, vitreous enamel, non-offset material, and similar substances, it is not only desirable but necessary that the air be free of water and other foreign materials, such as oil or the like. It is usual to filter or clean the air and to gather or accumulate the removed or extracted material in the bottom of the cleaner or extractor receptacle or chamber, and to occasionally drain out such material as by the opening of a valve. Inasmuch as such material may be viscous or in the nature of a sludge and slow to drain out, there is some disadvantage in using the ordinary or usual type of drain valve.

One of the objects of the present invention is to provide a novel valve in the lower part of a cleaner or extractor chamber to automatically drain out the extracted matter when the air pressure in the chamber falls below a given point and which will automatically close when the air pressure in the chamber rises to such point and remains closed so long as the pressure is maintained above that point.

Other objects, advantages, capabilities and features are comprehended by the invention as will later appear and as are inherently possessed by the invention.

Referring to the drawing:

Fig. 1 is a fragmentary sectional view of a chamber and an elevational view of the invention used therein;

Fig. 2 is a perspective view of the valve forming a part of the invention;

Fig. 3 is a vertical sectional view of the valve taken in a plane represented by line 3—3 in Fig. 2 of the drawing;

Fig. 4 is a vertical sectional view taken in a plane at right angles to that of Fig. 3; and, Fig. 5 is a horizontal sectional view taken in a plane represented by line 5—5 in Fig. 3.

Referring more in detail to the drawing, an embodiment of the automatic valve forming part of the invention chosen to illustrate the invention is shown connected to the lower part or bottom 1 of a chamber 2, the valve at its lower end having a threaded shank 3 screwed into a threaded hub or boss 4 formed integral with the bottom 1.

The valve comprises a body 5 preferably of polygonal form for fitting a suitable tool, as a wrench, for screwing the valve into the boss 4. In the body 5 is a valve chamber 6 having a pair of inlet ports 7 provided in two opposite side walls of the body 5, and a downwardly extending discharge passage 8 adapted to communicate with the threaded bore of the boss 4.

At the bottom of the chamber 6 and at the upper end of the passage 8 is provided a valve seat 9, which may be quite narrow, on which is adapted to seat a valve seat 10, which may be of frusto-conical form, at the lower end of a stem 11. The stem 11 is formed at the lower end of a valve shank 12 which is adapted to freely slide vertically in the upper extended portion 13 of the valve chamber 6, and which projects upwardly beyond the upper end of the valve body 5.

At the upper end of the shank 12 is secured a plate or disk 14 which may be held in place by an expanded or upset stem portion 15 acting more or less like a rivet head. Between this disk 14 and the upper end of the body 5 of the valve is interposed a spring 16 which normally acts upwardly against the disk 14 to hold the valve open when the air pressure in the chamber 2 is below a given point.

To prevent the valve stem 11 and shank 12 from rising too far or entirely out of the body 5, the stem 11 is provided with a limit stop 17, such as a cotter pin, extending through a suitable transverse aperture provided in the valve stem 11 and being of such a length as to abut against the upper portions of the inlet ports 7, as shown in Fig. 3 in particular.

In operation the air is passed through suitable filter or extracting means (not shown) in the chamber 2 and the water, oil and other matter extracted collects in the bottom of the chamber 2. When there is no air pressure in the chamber 2 or the air pressure is below a given point, such as for example eight pounds per square inch, the valve 10 is open or in raised position by reason of the force of the spring 16 acting against the disk 14, as shown in Figs. 3 and 4. The spring 16 may be chosen to be of such strength as to have the valve opened and closed at any given or predetermined point of pressure in the chamber.

When starting the cleaning or extracting device in operation, the air is simply admitted into it in any unusual manner. Until the air pressure rises to the point for the valve to close, such as eight pounds as above given by way of illustration, the pressure acts downwardly on the disk 14 with an effective area equal to that of the cross-sectional area of the shank 12, and upwardly against the valve 10 and the shoulder between the valve stem 11 and the valve shank 12 with the same effective area. At the same time air is flowing out by way of the ports 7, chamber 6 and discharge outlet 8, thus reducing the pressure on the lower end of the valve 10. This occurs with increasing result as the air pressure in the chamber 2 rises and the outflow of air increases in velocity thus proportionally reducing the pressure on the valve 10.

When the air pressure in the chamber 2 reaches the given point, as above illustrated, the reduction of pressure on the valve 10 becomes sufficient to overcome or counterbalance the upward force of the spring 16, and hence the valve descends to closed position instantaneously, and the valve is then held closed by reason of the pressure acting upon the top of the valve, that is, the disk 14, the valve 10 being seated on its seat 9. The valve 10 is held closed so long as the pressure is at or above the given pressure as above referred to.

At the end of a day's run, or the like, the worker will shut off the air supply to the extractor, and as the air pressure drops to the above mentioned predetermined point as given by way of example, or even slightly below it, the valve opens instantaneously and the accumulated extracted material will then drain out. When the air pressure drops as above described its pressure on the disk 14 is reduced to a point equal to the upward force of the spring 16, and hence when the latter predominates the spring 16 acts immediately to open the valve.

The accumulated material in the chamber 2 may be viscous and slow in draining out, but when the worker returns the next morning it is all drained out and the device in shape for starting operation.

While I have herein described and upon the drawings shown an illustrative embodiment of the invention, it is to be understood that the invention comprehends other structures, details, arrangements of parts, features, and the like, without departing from the spirit of the invention.

Having thus disclosed the invention, we claim:

1. An automatic drain valve connected in the lower part of a collecting chamber in which liquid material accumulates, comprising a valve chamber having an outlet leading to the exterior of the collecting chamber, and an inlet port provided at an intermediate part of the side of the valve chamber laterally of said valve chamber and communicating with the interior of the collecting chamber, an upwardly extending valve body above the valve chamber and having a passage, a valve movable in the valve chamber and having a shank slidable in said passage and extending above and exteriorly of said valve body to be exposed to the pressure in said chamber, and a spring on the upper end of said valve body exteriorly thereof and pressing upwardly against an upper portion of said shank to normally urge the shank and valve upwardly.

2. An automatic drain valve connected in the lower part of a collecting chamber in which liquid material accumulates, comprising a valve chamber having an outlet leading to the exterior of the collecting chamber, and an inlet port provided at an intermediate part of the side of the valve chamber laterally of said valve chamber and communicating with the interior of the collecting chamber, an upwardly extending valve body above the valve chamber and having a passage, a valve movable in the valve chamber and having a shank slidable in said passage and extending above and exteriorly of said valve body to be exposed to the presure in said chamber, an abutment member secured to the upper end of said shank, and a spring interposed between said member and the upper end of said valve body exteriorly thereof to normally urge the shank and valve upwardly.

3. An automatic drain valve connected in the lower part of a collecting chamber in which liquid material accumulates, comprising a valve chamber having an outlet leading to the exterior of the collecting chamber, and an inlet port provided at an intermediate part of the side of the valve chamber laterally of said valve chamber and communicating with the interior of the collecting chamber, an upwardly extending valve body above the valve chamber and having a passage, a valve movable in the valve chamber and having a shank slidable in said passage and extending above and exteriorly of said valve body to be exposed to the pressure in said chamber, a disk secured by an expanded rivet heat at the upper end of said shank, and a spring between said disk and the upper end of said valve body to normally urge the shank and valve upwardly.

4. An automatic drain valve connected in the lower part of a collecting chamber in which liquid material accumulates, comprising a valve chamber having an outlet leading to the exterior of the collecting chamber, and an inlet port provided at an intermediate part of the side of the valve chamber laterally of said valve chamber and communicating with the interior of the collecting chamber, an upwardly extending valve body above the valve chamber and having a passage, a valve movable in the valve chamber and having a shank slidable in said passage and extending above and exteriorly of said valve body to be exposed to the pressure in said chamber, and a spring on the upper end of said valve body and pressing upwardly against an upper portion of said shank to normally urge the shank and valve upwardly, and a limit stop for limiting the upward movement of said shank and valve, comprising a stop element secured to said valve and projecting to contact with a part of said valve body.

5. An automatic drain valve connected in the lower part of a collecting chamber in which liquid material accumulates, comprising a valve chamber having an outlet leading to the exterior of the collecting chamber, and an inlet port provided at an intermediate part of the side of the valve chamber laterally of said valve chamber and communicating with the interior of the collecting chamber, an upwardly extending valve body above the valve chamber and having a passage, a valve movable in the valve chamber and having a shank slidable in said passage and extending above and exteriorly of said valve body to be exposed to the pressure in said chamber, and a spring on the upper end of said valve body and pressing upwardly against an upper portion of said shank to normally urge the shank and valve upwardly, and a limit stop for limiting the upward movement of said shank and valve, comprising a cross pin extending from said valve and into said port for contacting the upper part of the port wall.

ERIC GUSTAFSSON.
WILLIAM L. WILMES.

CERTIFICATE OF CORRECTION.

Patent No. 2,323,764. July 6, 1943.

ERIC GUSTAFSSON, ET AL.

It is hereby certified that error appears in the printed specification of the above numbered patent requiring correction as follows: Page 2, second column, line 26, claim 3, for "heat" read --head--; and that the said Letters Patent should be read with this correction therein that the same may conform to the record of the case in the Patent Office.

Signed and sealed this 10th day of August, A. D. 1943.

(Seal)

Henry Van Arsdale,
Acting Commissioner of Patents.